June 20, 1933.   L. K. WRIGHT   1,914,877
APPARATUS FOR PREPARING GLAUCOSIL
Filed March 28, 1928
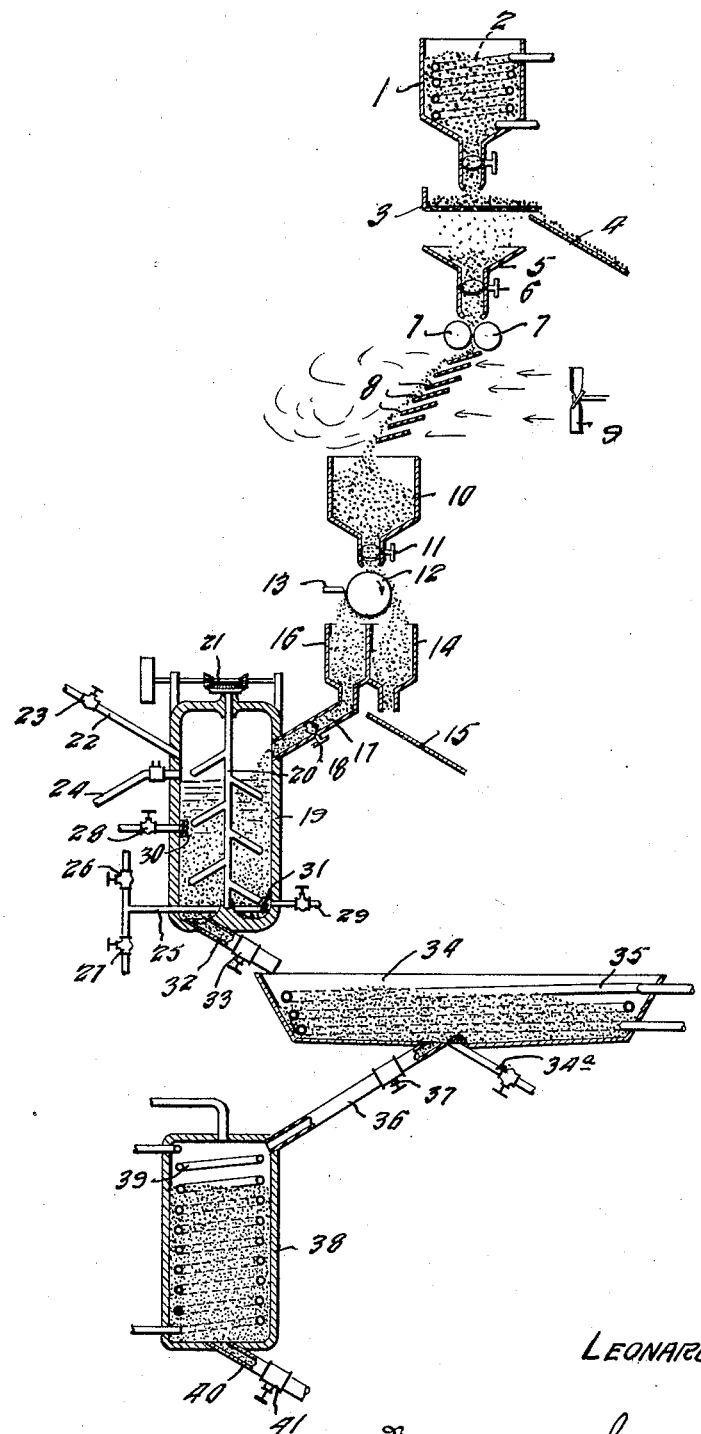
Inventor
LEONARD K. WRIGHT
By
Semmes & Semmes
Attorneys Patented June 20, 1933

1,914,877

UNITED STATES PATENT OFFICE

LEONARD KAY WRIGHT, OF JACKSON HEIGHTS, NEW YORK

APPARATUS FOR PREPARING GLAUCOSIL

Application filed March 28, 1928. Serial No. 265,379.

My invention relates to adsorption agents for refrigerating gases, and more particularly has reference to apparatus for making the adsorbent glaucosil.

Glaucosil is the natural silica skeleton of greensand and is pure silica in a highly activated form and is the siliceous residue left as a result of treating greensand with a mineral acid, as for example, sulphuric acid, and is also a by-product in the manufacture of potash and other materials from greensand.

Greensand beds are in general unconsolidated deposits consisting of variable proportions of glauconite grains, clay, quartz and a variety of small fragments of other materials, these proportions varying with the locality. The glauconite imparts a greenish color to beds in which it occurs, and beds consisting largely of dark green or black glauconite appear nearly black when freshly opened. The clay like constituents impart color to the beds, and where abundant, produce material of drab or chocolate-brown color. Where the quartz content of the material is high the bed may produce a material resembling that of a mixture of pepper and salt. Glauconite grains range in size from less than one one-hundredth to more than one-twentieth of an inch.

Many methods of treating greensands have been proposed but these have generally had for their object the extraction of potassium salts and allied compounds from the greensands. These methods have involved treating the greensands with both acids and bases in both wet and dry processes, but all these methods while successful for the purpose intended, do not result in yielding a pure silica glaucosil, but always a more or less complex compound of silica and other reaction products of the materials with which the greensand is treated.

The methods heretofore employed in treating greensand have necessitated expensive and intricate apparatus, have been extremely costly, and have not yielded a pure silica in highly activated form.

An object of this invention is to devise a process and apparatus for the production of a pure silica in highly activated form.

Another object of this invention is to provide a process and apparatus for treating a siliceous substance to secure a very pure and finely divided form of silica.

Still another object of this invention is to provide a process and apparatus for treating greensand to obtain natural silicia skeleton thereof uncontaminated by impurities.

A still further object of my invention is to devise a process and apparatus for extracting pure glaucosil from greensand without losing the other valuable constituents in the greensand.

With these and other objects in view, which may be incident to my improvements, the invention comprises the parts and combinations to be hereinafter set forth and claimed, with the understanding that the several elements hereinafter described may be varied in construction, arrangement and proportions, without departing from the spirit and scope of the appended claims.

In order to make my invention more clearly understood, I have shown in the accompanying drawing means for carrying the same into practical effect, without limiting the improvements in their useful application to the particular constructions, which for the purpose of explanation, have been made the subject of illustration.

In the drawing I have shown in vertical section the several pieces of apparatus in their functional relationship with each other necessary to carry out my preferred process.

The greensand is obtained from the pit or source of supply and dumped into the receiving or crude bin, 1, which may be provided with steam coils 2 to dry the material. The greensand may be previously dried to some extent if desired by passing over steam plates, or by drying in the air. Before leaving bin 1, the greensand must be sufficiently dry so that it will flow without binding or choking in the vessels or delivery tubes.

The dry material is then passed through a vibrating screen or screens 3 and the larger sizes of associated material are removed and discharged as waste or tailings down an inclined chute 4. Because of the variance in the size of the glauconite grain (that is from 1/100 to 1/20 of an inch, this variance being more pronounced in some beds and localities), it may be advantageous to have the grains of a similar size, as the treatment can then be accurately timed and each grain will be uniformly affected. Therefore, after passing through the vibrating screen, 3, the material is passed through a hopper 5 having a control discharge valve 6 and through a set or series of rolls 7 for the purpose of producing a more uniform sized grain.

The material is then allowed to fall or cascade over a series of inclined plates or louvre riffles 8, while a draft or current of air is forced through the cascading material by a suitable blower 9, removing the dust and fines. The material is now composed of grains of approximately the same size.

In order to remove associated material, such as clay, quartz and a variety of other minerals the material is passed through another hopper 10 with control valve 11 to a separation apparatus, which may be either or both of the following. Where the glauconite grains contain appreciable amounts of ferrous iron an electro-magnetic separator 12 with scraper 13 may be used, but some glauconites are best separated by the electrostatic method. Either or both methods produce material of a high degree of concentration. The waste or tailings is of course removed by discharging to the right into a bin 14, thence down an inclined chute 15 and the separated glauconite deposited by discharging to the left into another bin 16. This bin delivers the separated material to a digester or digester apparatus through a supply pipe 17 provided with a control valve 18.

The digester consists of a vessel 19 provided with a stirring device 20, driven by any convenient means 21. Supply pipe 17 entering near the head supplies the digester with the glauconite. Another pipe 22 with control valve 23 supplies the digester with acid or acidulated mixture for the digestion of the glauconite. The vessel must be of such material that it is not affected by the acids used, which are mineral acids, such as sulphuric and nitric, or mixtures of both, or mixtures of either or both with water. An overflow pipe 24 is located at such height in the digester that it will carry off water and waste matter which rises to the surface. At or near the bottom, the vessel 19 is provided with a water supply 25, of both hot water 26 and cold water 27.

I find it best to allow the glauconite to fall into the digester chamber when the latter is filled with water and the stirring device is in operation. I also have the cold water entering the vessel from the bottom. The glauconite is thus washed and freed of any adhering or embedded dust or dirt, this extraneous material being carried away by the overflow. When the overflow water discloses a clear condition I stop the flow of water into the digester, and open a drain cock 28 which bleeds off the surplus water. This drain cock is located at some height above the bottom so that a certain amount of water is retained in the vessel.

I then allow a weighed or measured amount of acid or acidulated mixture to flow into the digester through pipe 22. Then I allow the stirring device 20 to revolve and the material to digest for a period of hours. This varies with the strength of the acid solution and the fineness of the glauconite grains, and may take anywhere from two hours to forty-eight hours.

At the end of the digesting period I allow hot water to enter the digester through pipes 26 and 25 near the bottom so that the water will wash and remove the products of this acid bath, and flow away with the overflow. The products are water soluble and the warmer the washing water the greater solubility. The best temperature is that near the boiling point of the water, for at that point the water will remove its greatest amount of solubles. The mass left in the digester consists mainly of silica and no harm due to heat can be accomplished. Now when the overflow discloses a clear condition the hot water supply 26 may be shut off and the digester drained of water through drain cock 29. The water drains 28 and 29 must of course be provided with screens 30 and 31 to prevent the escape of glauconite or glaucosil. These screens are preferably of dual type so that one screen can be removed and cleaned while the other is left in service. The acid treated and washed material is then discharged by gravity through a short pipe 32 with control valve 33 into a draining tray 34, where most of the water may be separated. This tray is provided with a water drain pipe 34—a and may also be equipped with steam heating coils 35 to assist in the removal of the water content.

This draining tray also acts as a storage bin for the material. When the material is to be used it is discharged by gravity from the draining tray 34 through a pipe 36 and control valve 37 to a vacuum dryer 38, provided with steam coils 39 which heat the material and remove the moisture content. From this vacuum dryer the material is discharged by gravity through pipe 40 and valve 41 and can be placed in immediate service or it may be placed in sealed or closed storage tanks (not shown) pending its use.

The material, glaucosil, is of a light greenish tint, with some black and brown grains. It flows as easily as the sand in an hour glass, and care must be taken in the drying tray 34 to see that the finest crack or seam is protected, otherwise sometimes an entire batch will escape.

The purpose of the acid or acidulated bath is to remove as much matter from the glauconite granule as possible, leaving only its silica skeleton. This skeleton consists of minute, almost ultra-microscopic, capillary tubes which have the power of drawing within themselves any gas or vapor and causing the gas or vapor to condense in the narrowed confines of the capillary tubes.

When the glaucosil is intended for use in refrigerating apparatus and is filled into the adsorber vessel, a desirable feature is to get as much material as possible into the shell, that is, within certain limits. The obvious point being that the more adsorbent in the vessel the greater the adsorbing power. Grains or granules of fairly constant and like sizes leave considerable space between each other. This space is such that it is wasted, for gases will find their way to each and every particle of glaucosil without these voids. Therefore while these grains are produced as almost alike in size by the treatment herein it may be advantageous where space conservation is a desirable factor to grind or crush a portion which reduces the interstices between grains, and allows a greater quantity to be packed into a given space.

Where a variation in size of grain is desired, it is best to accomplish this in the first reducing or crushing process in reducing rolls 7, as the smaller the grain the faster the treatment and also to some extent the more effective is the treatment, for with large grains there is a tendency to leave an untreated core or nucleous. This can be accomplished by deflecting a portion of the stream of greensand discharging from the hopper 5 to another alternate set of rolls 7 of smaller setting so that a portion of the sand will be simultaneously crushed to a finer size than the main stream which passes through the regular rolls 7. Both streams intermingle and mix in bin 10.

From the foregoing it is apparent that the liquids drawn off from the digester 19 may be subsequently treated to recover potassium salts and valuable allied compounds without in any way detracting from the efficiency of my process.

While I have shown and described the preferred embodiment of my invention, I wish it to be understood that I do not confine myself to the precise details of construction and sequence herein set forth by way of illustration, as it is apparent that many changes and variations may be made therein by those skilled in the art, without departing from the spirit of the invention, or exceeding the scope of the appended claims.

I claim:—

1. An apparatus for producing glaucosil comprising, in combination, a receptacle having drying means therein, a vibrating screen for sizing the material discharged from the receptacle, a plurality of crushing rolls for reducing the size of the undersized material from the screen, a series of inclined plates, means for forcing air thereover for removing light extraneous matter from the crushed material, an electric separator for removing the magnetic constituents of the material from the plates, a digester for removing impurities from the electrically treated material and a dryer for removing the moisture from the purified material.

2. A material treating apparatus for producing glaucosil comprising, in combination, a receptacle having drying means therein into which the material to be treated is deposited, a vibrating screen for sizing the material discharged from the receptacle, a plurality of crushing roll adapted to receive undersized material from the screen and to produce material of uniform size, a series of inclined plates, means for forcing air thereover for removing light extraneous matter from the crushed material, an electric separator adapted to separate the magnetic from the non-magnetic material discharged from the inclined plates, a digester for removing impurities from the electrically treated material, a dryer for removing the moisture from the digester-treated material and means for controlling the flow of material from one element to another.

In testimony whereof I affix my signature.

LEONARD KAY WRIGHT.